(12) United States Patent
Shimozono et al.

(10) Patent No.: US 7,112,940 B2
(45) Date of Patent: Sep. 26, 2006

(54) FREQUENCY CONVERTER, MOTOR, MOTOR DRIVE SYSTEM AND MAINTENANCE METHOD FOR MOTOR DRIVE SYSTEM

(75) Inventors: Tadahiro Shimozono, Yachiyo (JP); Takeshi Obata, Narashino (JP); Koichiro Saito, Funabashi (JP); Osamu Matsumoto, Yachimata (JP); Kouji Obata, Hitachi (JP)

(73) Assignee: Hitachi Industrial Equipment Systems Co., Tokyo (JP)

( * ) Notice: Subject to any disclaimer, the term of this patent is extended or adjusted under 35 U.S.C. 154(b) by 0 days.

(21) Appl. No.: 11/171,354

(22) Filed: Jul. 1, 2005

(65) Prior Publication Data

US 2006/0001396 A1    Jan. 5, 2006

(30) Foreign Application Priority Data

Jul. 2, 2004   (JP)   ............................. 2004-196188

(51) Int. Cl.
*H02P 27/04*   (2006.01)

(52) U.S. Cl. .................. 318/800; 318/254; 318/138; 318/439; 318/811; 318/802; 318/810

(58) Field of Classification Search ................ 318/800, 318/254, 138, 439, 811, 802, 810; 363/39, 363/35, 37
See application file for complete search history.

(56) References Cited

U.S. PATENT DOCUMENTS 4,651,266 A * 3/1987 Fujioka et al. ................ 363/39
5,187,652 A * 2/1993 Steimer ........................ 363/37
6,152,699 A * 11/2000 Shikata et al. ................ 417/12

OTHER PUBLICATIONS

'Influence of Insulation of General Motor Driven with 400 V Class Inverter, The Japan Electrical Manufactures' Association, a corporate juridical person, Mar. 1995.

* cited by examiner

*Primary Examiner*—Karen Masih
(74) *Attorney, Agent, or Firm*—Antonelli, Terry, Stout and Kraus, LLP.

(57) ABSTRACT

A frequency converter for outputting a power to drive a motor, having: an inverter unit for inverting a d.c. power to an a.c. power; a control unit for controlling the inverter unit; and a housing for supporting at least the inverter unit and control unit, wherein a rise time change unit is provided in the housing, the rise time change unit changes a rise time of a waveform of a voltage output from the inverter unit.

13 Claims, 6 Drawing Sheets

| | INDUCTANCE (mH) | | |
| --- | --- | --- | --- |
| | (1) | (2) | (3) |
| ONLY WIRING | •—• | | |
| WOUND WIRING (INSIDE BOARD) | | •—• | |
| CORE-LESS REACTOR (OUTSIDE BOARD) | | •——• | |
| NOISE FILTER | | | •—• |
| AC REACTOR (FOR NOISE) | | | •—• |
| REACTOR OF SINE WAVE FORMING FILTER (FOR SURGE) | | | •——• |
| | 0.001mH | 0.2mH | |

FREQUENCY CONVERTER, MOTOR, MOTOR DRIVE SYSTEM AND MAINTENANCE METHOD FOR MOTOR DRIVE SYSTEM

INCORPORATION BY REFERENCE

The present application claims priority from Japanese application JP 2004-196188 filed on Jul. 2, 2004, the content of which is hereby incorporated by reference into this application.

BACKGROUND OF THE INVENTION

The present invention relates to techniques of driving a motor with a frequency converter.

"Influence of Insulation of General Motor Driven with 400 V Class Inverter", the Japan Electrical Manufacturers' Association, a corporate juridical person, 1995, Mar. has the following description that "While a motor is driven with an inverter, a surge voltage generated by switching of the inverter is superposed upon an output voltage of the inverter. If this surge voltage is high, insulation of the motor is adversely affected, resulting in a broken case. This document describes the inverter surge voltage generation mechanism and its countermeasure in order to avoid beforehand such a case (an excerpt from p. 1, ll. 2 to 6)."

This document further gives the following methods as a countermeasure for insulation damages by a surge voltage during driving a motor with a 400 V class inverter (an excerpt from p. 3, ll. 2 and 3):

"4. 2 Surge Voltage Suppressing Method

There are a voltage rise suppressing method and a peak value suppressing method in order to suppress a surge voltage.

Output Reactor

If a wiring length is relatively short, a surge voltage can be lowered by suppressing a voltage rise (dv/dt) by installing AC reactors on the output side of an inverter (refer to FIG. 4(1)).

However, if the wiring length becomes long, it becomes difficult to suppress the peak value of a surge voltage in some cases.

Output Filter

A peak value of a terminal voltage of a motor is suppressed by installing filters on the output side of an inverter (refer to FIG. 4(2)) (an excerpt from p. 3, ll. 6 to 15)."

FIG. 4 in the indications in parentheses (refer to FIG. 4(1) and FIG. 4(2)) in the excerpts is the drawing in the document and does not concern FIG. 4 in this specification.

SUMMARY OF THE INVENTION

Conventional techniques are, however, unsatisfactory in that although deterioration of insulation between windings to be caused by a surge voltage can be avoided by using AC reactors whose essential object is to reduce noises, the AC reactors are generally large and expensive and in addition installation space and cost are increased because of additional components. With the method using output filers or sine wave forming filters, these filters are large and expensive.

There is another problem of a lowered effective voltage to be supplied from an inverter to a motor, if AC reactors, output filers or sine wave forming filers are used.

In consideration of these problems, the present invention has as its objects to improve insulation deterioration between motor winding turns to be caused by a surge voltage, with compactness, cost reduction and the like being considered, and to suppress an effective voltage from being lowered through insertion of AC reactors, output filters or sine wave forming filters.

In order to achieve the above-described objects, in providing a rise time change unit for reducing a surge voltage influence by changing a rise time of the waveform of a voltage to be applied to motor windings, the present invention obtains an inductance of the rise time change unit for reducing the influence of a surge voltage between motor wiring turns, in accordance with predetermined first and second characteristics and by the following procedure.

First, the first characteristics are obtained which indicate the relation between a rise time of a voltage to be applied to the motor windings and a value of a voltage (hereinafter called a surge withstand voltage) at which partial discharge will not occur between motor windings.

In accordance with the first characteristics, a rise time (hereinafter called a surge voltage suppressing rise time) of a voltage output from an inverter is obtained at which the partial discharge is suppressed from being generated between motor winding turns.

Next, the second characteristics are obtained which indicate the relation between inductances of reactors provided between the inverter and motor and a change in the rise time of the voltage output from the inverter.

The inductance satisfying the surge voltage suppressing rise time is obtained from the second characteristics. Reactors having the obtained inductance are provided between the inverter and motor windings. The reactor may be wound windings, a core-less reactor without an iron core or the like. The installation position may be arbitrary positions between the inverter and motor, in a control board on which the inverter is mounted, in a case of the inverter, or in the case of the motor.

The rise time change unit having reactors with the inductance obtained by the above procedure can reduce the influence of a surge voltage which causes insulation deterioration between motor winding turns, with a structure simpler than a conventional structure. The rise time change unit can be provided in a compact structure and at a low cost.

According to the present invention, a motor drive system having the reliability higher than a conventional reliability can be provided.

Other objects, features and advantages of the invention will become apparent from the following description of the embodiments of the invention taken in conjunction with the accompanying drawings.

DESCRIPTION OF THE EMBODIMENTS

Preferred embodiments of the present invention will be described.

Prior to describing the embodiments, description will be made on generation of a discharge phenomenon called partial discharge between motor winding turns to be cased by a surge voltage.

A surge voltage is considered to be generated in such a manner that when a power is applied from an inverter to a motor via a wiring system, a voltage reflection wave is generated by an impedance difference between the wiring system and motor, and this reflection wave is returned to the inverter and applied also to the motor. Therefore, a theoretical maximum value of a surge voltage is twice a maximum value of an applied voltage.

Figure 2:
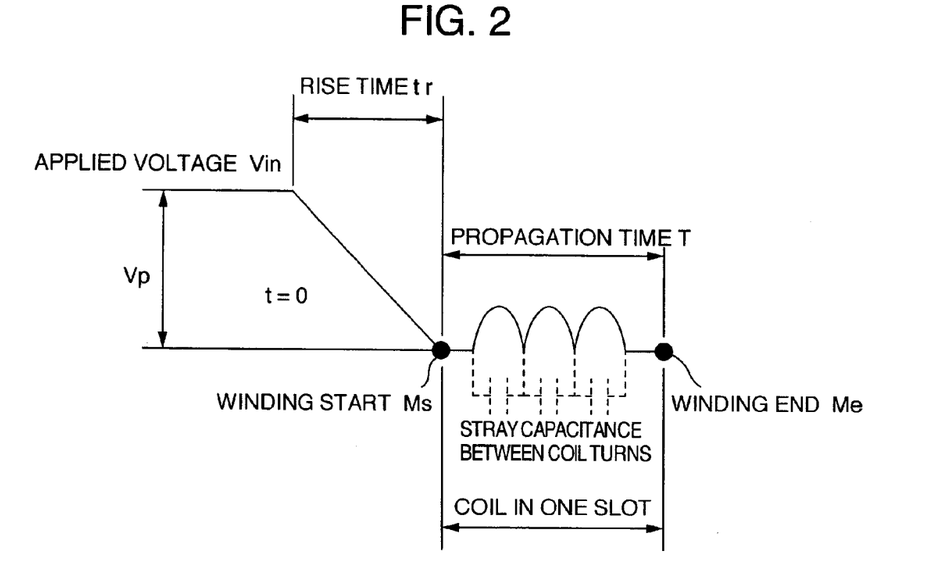
FIG. 2 is a diagram showing the position of a surge voltage rushing into a winding.

FIG. 2 is a schematic diagram showing the waveform of a voltage applied between stator winding turns of a motor. As shown in FIG. 2, it is assumed that the waveform of a voltage applied to a motor does not rise vertically to a voltage value Vp but it shows a voltage rise change having a slope and rises to the voltage value Vp after tr second. A voltage waveform Vin shown in FIG. 2 is the voltage waveform when the applied voltage reaches a coil winding start position Ms at time t=0. Therefore, as shown in the voltage waveform Vin in FIG. 2, a potential at the winding start Ms is zero at time point t=0.

The potential at a winding end position Me is also zero at t=0. A potential difference between the winding start Ms and winding end Me is therefore also zero.

A coil shown in FIG. 2 is an example of a coil of a stator on the field side. FIG. 2 shows the coil accommodated in one of a plurality of slots of the stator. A propagation time T is a time taken for an applied voltage waveform at the winding start Ms to reach the winding end Me.

The applied voltage Vin shown in FIG. 2 is assumed that it reaches the winding start Ms at t=0, propagates to the right in FIG. 2 and reaches the winding end Me after T second.

Figure 3A:
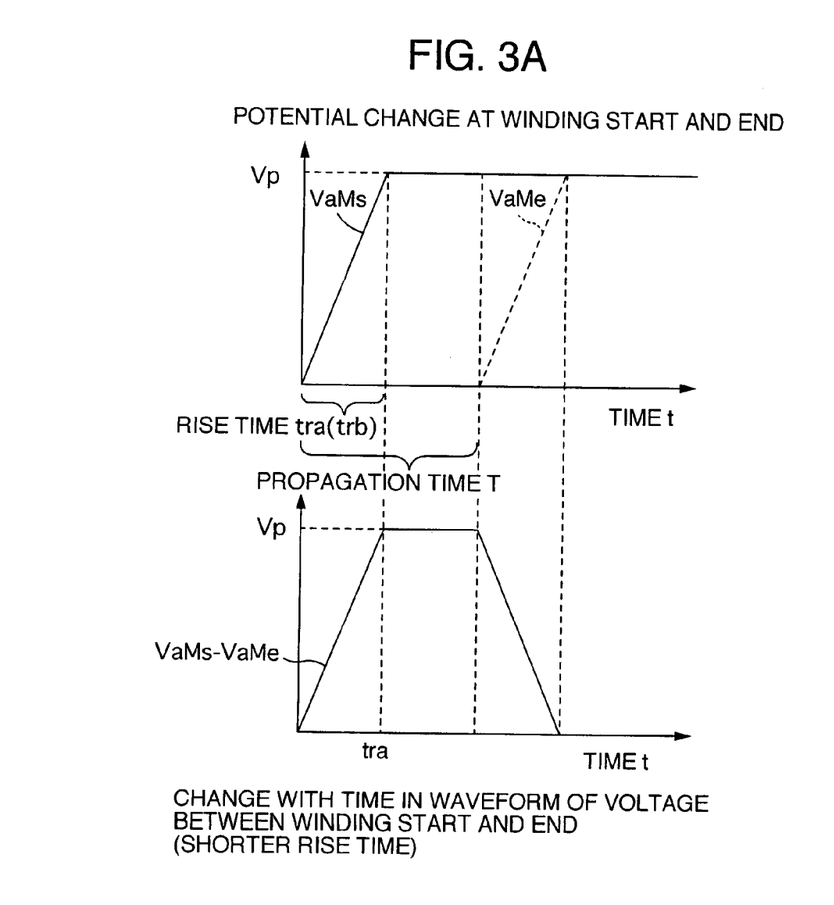
FIGS. 3A and 3B are diagrams illustrating the generation principle of a partial voltage.
Figure 3B:
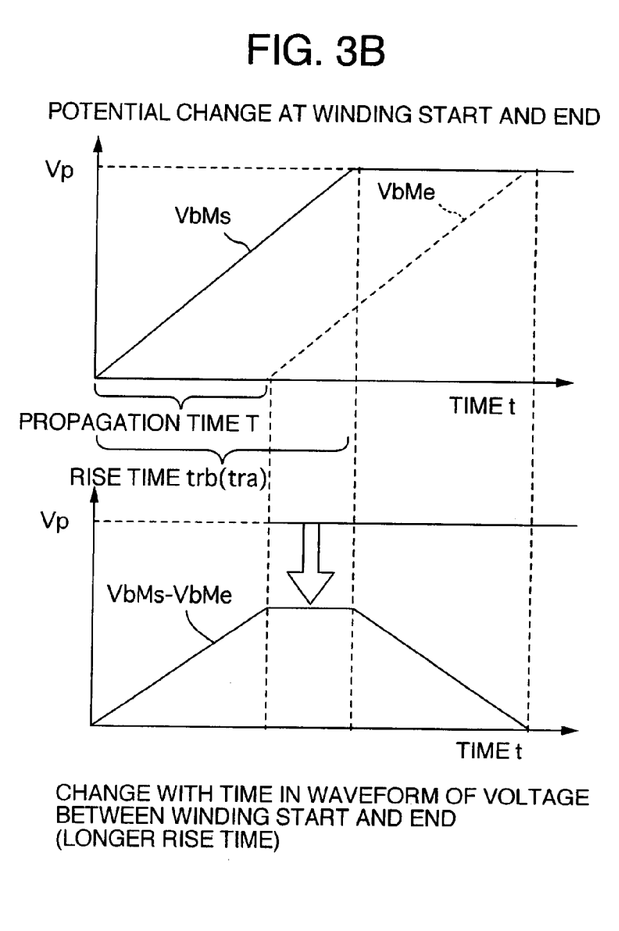

FIGS. 3A and 3B show potential changes at the winding start Ms and winding end Me as the voltage wave shown in FIG. 2 propagates to the right. FIG. 3A shows a shorter rise time, and FIG. 3B shows a longer rise time.

In FIG. 3A, a potential VaMs at the winding start Ms taking zero at t=0 takes a voltage value Vp after tra second which is a voltage waveform rise time.

An applied voltage will not reach the winding end Me until t=T and the potential VaMe at the position of the winding end Me is zero. Therefore, as the potential VaMs at the winding start Ms rises, a potential difference (VaMs−VaMe) between the winding start Ms and winding end Me rises from zero toward Vp. After t=T, as the potential VaMe at the winding end Me rises, the potential difference (VaMs−VaMe) takes a flat value and then lowers toward zero, showing a trapezoidal change.

The shorter rise time in FIG. 3A has been described above. The longer rise time in FIG. 3B is similar to the shorter rise time and the description thereof is omitted.

A potential difference between arbitrary two points of a coil applied with a voltage is represented by a percent relative to the applied voltage. This is generally called a partial voltage. It is considered that as the amplitude of a partial voltage becomes large, partial discharge occurs between motor winding turns.

With reference to FIGS. 3A and 3B, description will be made on an amplitude of a partial voltage, a rise time and a propagation time.

FIGS. 3A and 3B show a potential difference, i.e., a partial voltage, between the winding start Ms and winding end Me set to arbitrary two points of a coil.

As seen from FIGS. 3A and 3B, there is a tendency that the shorter the rise time, the larger the partial voltage, and the longer the rise time, the smaller the partial charge voltage. This can be confirmed from that although the maximum value of the potential difference waveform (VaMs−VaMe) between the winding start and winding end is Vp, the maximum value of the potential difference waveform (VbMs−VbMe) between the winding start and winding end is smaller than Vp.

In other words, if an applied voltage rises steeply, the partial voltage becomes large, whereas if an applied voltage rises gently, the partial voltage becomes small. This matches the reported case.

Although the relation between the propagation time and partial voltage is not discussed above, there is a tendency that as a propagation time becomes long, the partial voltage becomes large, whereas as the propagation time becomes short, the partial voltage becomes small.

Since a propagation speed of the voltage wave is constant, the propagation time is proportional to a propagation distance. Therefore, as the length of a coil becomes long, the partial voltage becomes large, or as the distance between two points of a coil across which a partial voltage is measured becomes long, the partial voltage becomes large.

Therefore, in FIGS. 2 and 3A and 3B, the partial voltage is studied by using the winding start Ms and winding end Me having a maximum length of a coil as arbitrary two points of the coil, to thereby obtain study results of partial voltages higher than the partial voltage between the winding start and winding end.

Even if the partial voltage between the winding start Ms and winding end Me becomes maximum, the discharge phenomenon does not occur if both winding points are spaced more than a discharge start distance. However, since a coil is wound in the slot at random by using a winding machine, there is a case that the winding start Ms and winding end Me are positioned within the discharge start distance.

Considering this case, the generation of the partial discharge by a partial voltage has been studied assuming that a large partial voltage is generated because the winding start Ms comes near the winding end Me. In other words, under this condition if there is any solution means for suppressing the partial discharge, the partial discharge can be suppressed even under other conditions and states.

For the simplicity of the above description, although the maximum value of a partial voltage is set to 100% of the applied voltage, this value is actually lower than 100%.

Experiment results indicate that the partial voltage is 80% at a rise time of 0.1 µs and almost saturates at 80%. It is known that this saturation of the partial voltage results from the influence of capacitance between winding wires shown in FIG. 2.

The following measurements have been conducted to obtain the first characteristics, on the basis of the above described phenomenon. For these measurements, a test equipment was used which can generate a variable amplitude and rise time of an output voltage. A pseud surge voltage output from the test equipment was applied to a pseud motor winging. The pseud motor winding is an experimental motor winding satisfying the conditions of easy occurrence of the partial discharge in which a maximum propagation time and a large partial voltage are given and the winding start Ms and winding end Me are disposed in close proximity to each other.

By using this test equipment, partial discharge start voltages between windings were measured and the relation was obtained between a rise time and a partial discharge start voltage across windings by the partial voltage.

The measurements were conducted by using the test equipment for generating an experimental surge voltage and experimental motor windings. Therefore, the first characteristics were obtained by correcting the measurement results by considering various states such as actual application times of the surge voltage and the like, so as to realize the state as if the surge voltage is applied to an actual motor.

Analysis was made on the measurement results of the partial discharge start voltage and the partial voltage at each rise time. A 400 V class, 22 kw motor was assumed to be a standard motor subjected to the measurement object.

(1) A value of a voltage at which a partial discharge occurs in a motor winding was measured by setting constant the rise time of an output voltage from the test equipment and raising the output voltage value.

(2) The rise time was changed in the range from 0.01 µs to 10 µs in the measurements (1).

Figure 4:
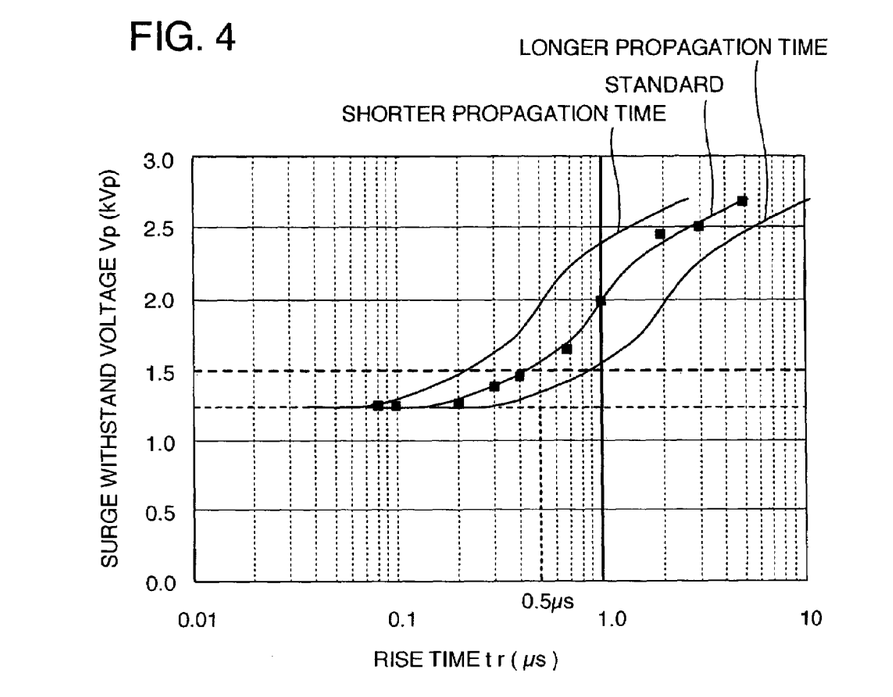
FIG. 4 is a graph showing the relation between a rise time and a surge withstand voltage.

The results of the measurements (1) and (2) are shown in FIG. 4.

It is possible to know from FIG. 4 the voltage value at which the partial discharge occurs at each rise time. In other words, it is possible to know the rise time of an applied voltage at which the partial discharge will not occur. For example, it can be known that the rise time is set to 0.5 µs or longer to obtain a surge withstand voltage of 1500 Vp.

The following measurements were conducted to obtain the second characteristics.

For the measurements, a voltage having predetermined value and rise time was applied to a motor winding and reactors were connected to the input terminals of the motor windings.

(1) A voltage having a predetermined rise time was applied across motor windings, and a rise time changed by the inductance of the inserted reactors was measured.

(2) The inductance of the reactors was changed in the range from 0.0001 mH to 30 mH in the measurements (1).

Figure 5:
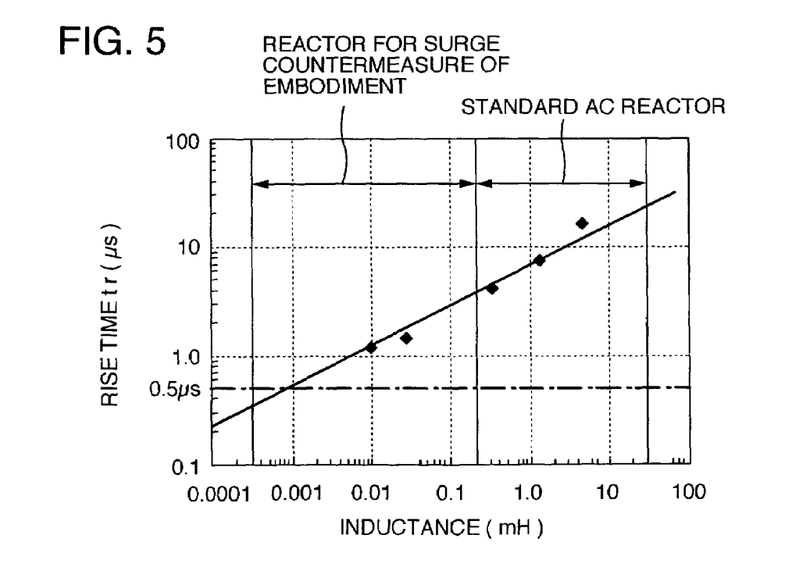
FIG. 5 is a graph showing the relation between an inductance and a rise time.

The results of the measurements (1) and (2) are shown in FIG. 5.

It can be known from FIG. 5 the inductance of the reactor necessary for obtaining a desired rise time. This relation is used as the second characteristics.

Embodiments of the present invention will be described using the first and second characteristics.

[First Embodiment]

Figure 1:
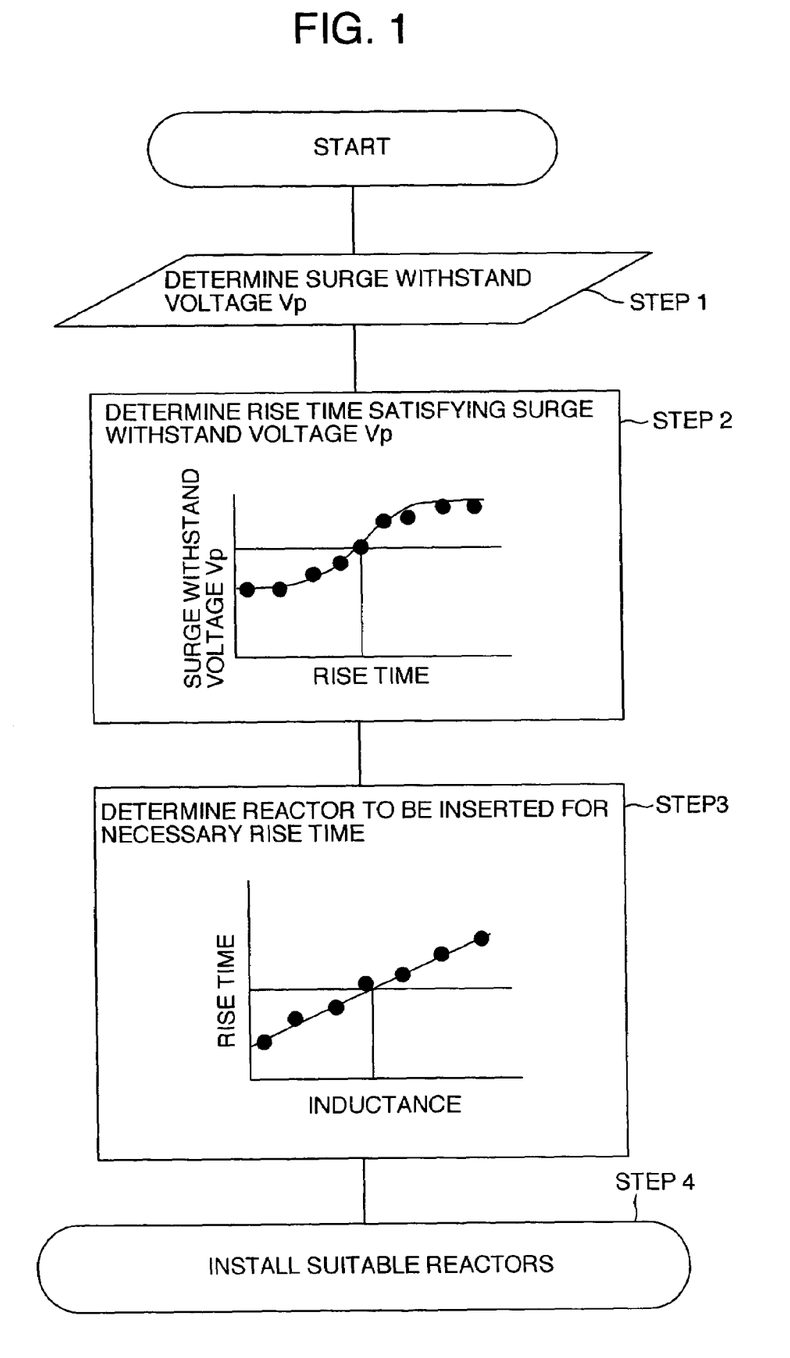
FIG. 1 is a flow chart illustrating an embodiment of the present invention.

In this embodiment, the inductance of a reactor can be calculated easily on the basis of the above-described measurement results. FIG. 1 is a flow chart illustrating the embodiment method. The flow and procedure of the method will be described with reference to FIG. 1.

(Step 1) A target surge withstand voltage for suppressing the partial voltage is determined from motor specifications and the like.

(Step 2) A rise time for lowering the surge voltage to the target surge withstand voltage is determined from the first characteristics.

(Step 3) An inductance of a reactor to be inserted for setting the rise time for lowering the surge voltage determined in (Step 2) is determined from the second characteristics.

(Step 4) Reactors having the inductance determined in (Step 3) are inserted between an inverter and motor windings.

In accordance with the flow and procedure described above, the inductance of a reactor capable of reducing the influence of the surge voltage was 0.01 mH in some cases at the surge withstand voltage of 1500 V. The reactor having this inductance may be a core-less coil without an iron core or the like. It has been confirmed from experiments that even a core-less coil can prevent surge by reducing the influence of the surge voltage and suppressing the partial discharge between motor windings.

[Second Embodiment]

Figure 6:
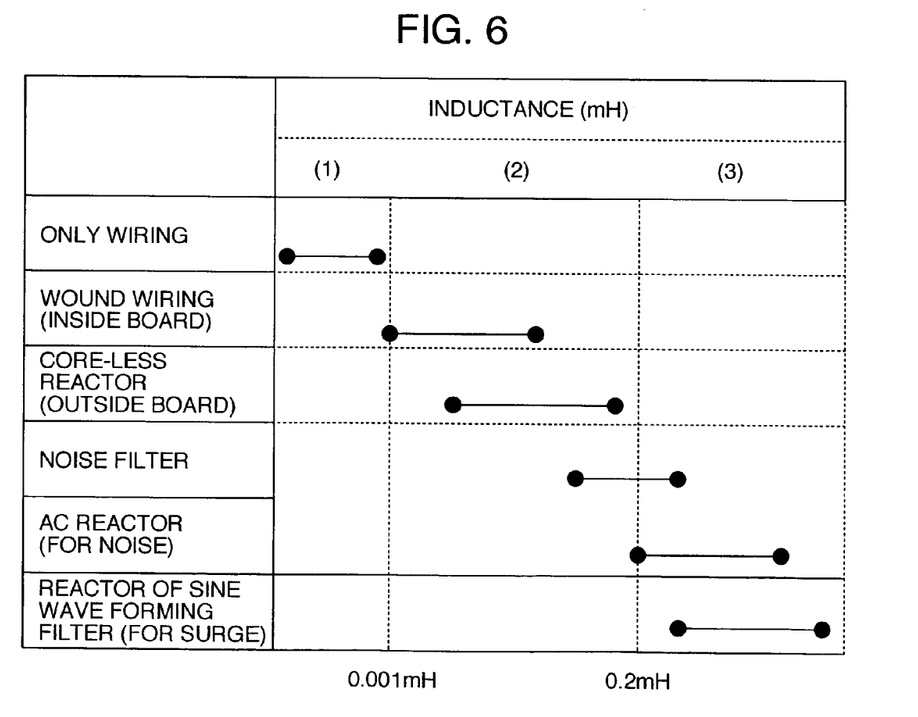
FIG. 6 is a table showing the relation among a reactor type, an inductance and upper and lower limits of insulation deterioration start.

FIG. 6 shows the correlation between the inductances of reactors of various types and the inductances of the embodiment capable of suppressing insulation deterioration to be caused by a surge voltage.

The inductance in the range (1) shown in FIG. 6 is an inductance of wiring. In other words, no countermeasure for reducing the influence of the surge voltage is made and this range is shown for the comparison with other types of reactors. If the inverter and motor are connected by the inductance in the range (1), insulation deterioration by the surge voltage may occur.

The inductances in the ranges (2) and (3) shown in FIG. 6 can change the rise time of a surge voltage longer so that the influence of the surge voltage can be reduced.

In the range (3), although the surge voltage influence can be reduced, an effective voltage applied to the motor may be lowered.

In contrast, the range (2) has a small drop of the effective voltage and does not pose any problem. The "wound wiring" and "core-less reactor" are light and small in volume, has a small drop of the effective voltage, can be made compact and not expensive, and changes less the already installed facilities. They are suitable for reducing the surge voltage influence.

[Third Embodiment]

The above-description has been directed to the product of a standard 22 kw motor. Depending upon a motor capacity, the length from the winding start to winding end of a coil changes. As the winding length changes, the propagation time changes so that the relation between the rise time and surge withstand voltage changes.

For example, as the motor capacity becomes small, a surge voltage propagation time in a motor winding becomes short. Therefore, curves of the surge withstand voltages shown in FIG. 4 shift to the left and the standard curve shifts to the curve of "shorter propagation time". As the motor capacity becomes large, a surge voltage propagation time in a motor winding becomes long. Therefore, curves of the surge withstand voltages shown in FIG. 4 shift to the right and the standard curve shifts to the curve of "longer propagation time".

Description will be made on the relation between three types of motors "shorter propagation time", "standard" and "longer propagation time". The "standard" in FIG. 4 shows the characteristics of a standard 22 kw motor. The "shorter propagation time" motor has a capacity smaller than that of the "standard" motor and a half of the propagation time of the "standard" motor. The "longer propagation time" motor has a capacity larger than that of the "standard" motor and a twice of the propagation time of the "standard" motor.

With reference to FIG. 4, brief description will be made on the relation between the surge withstand voltage and rise time relative to each motor capacity. For example, in order to obtain a surge withstand voltage of 2000 Vp, a rise time of 1 µs or longer is required for the "standard" motor. In order to obtain the same surge withstand voltage of 2000 Vp, a rise time of 2 µs or longer is required for the "longer propagation time" motor, and a rise time of 0.5 µs or longer is required for the "shorter propagation time" motor.

The rise time necessary for reducing the surge voltage influence changes with the motor capacity so that the inductance of a reactor necessary for the rise time also changes.

In the above description, the surge withstand voltage is set to 1500 Vp. Since the surge withstand voltage changes with the motor capacity, the necessary inductance changes in some cases.

If reactors are inserted, a voltage drop may occur. It is not preferable if the effective voltage applied to the motor lowers more than necessary by inserting the reactors for lowering the surge voltage.

As described above, the inductance of reactors for reducing the surge voltage influence cannot be determined definitely, but it changes as described above and in accordance with the use state, conditions and applications of a frequency converter, a motor and a system including the frequency converter and motor. The inductance of reactors for reducing the surge voltage influence is defined in the following three ranges, by considering the motor type, the surge withstand voltage, a drop of the effective voltage, a safety factor and the like.

(1) First Range (Range of $\geqq 0.04$ mH and $\leqq 0.2$ mH)

This range is obtained from the measurement results of "longer propagation time" shown in FIG. 4. It can be understood from FIG. 4 that a surge voltage of 2000 Vp is satisfied at 0.04 mH and a surge voltage of 2300 Vp is satisfied at 0.2 mH.

This range has an upper limit of 0.2 mH and can reduce the surge voltage influence for almost all types of motors. There is a tendency that both the volume and weight of a reactor having an inductance of about 0.2 mH become large. However, as compared to a conventional AC reactor, it can be said the volume and weight are still small.

(2) Second Range (range of $\geqq 0.004$ mH and $\leqq 0.04$ mH)

This range is obtained from the measurement results of "longer propagation time" shown in FIG. 4. It can be understood from FIG. 4 that a surge voltage of 1500 Vp is satisfied at 0.004 mH and a surge voltage of 2000 Vp is satisfied at 0.04 mH.

Although this range cannot reduce the surge voltage influence for almost all types of motors as different from the first range, it is characterized in that a drop of the effective voltage is as small as it poses no problem. It can be anticipated that if a reactor having an inductance of about 0.004 mH is used, it may become necessary to adjust the surge voltage 1500 Vp in order to reduce the surge voltage influence. However, this range can reduce the surge voltage influence for many types of motors.

A reactor having an inductance of about 0.04 mH has a small volume and weight so that it is advantageous in compactness and light weight.

(3) Third Range (Range of $\geqq 0.0003$ mH and $\leqq 0.004$ mH)

This range is obtained from the measurement results of "standard" shown in FIG. 4. It can be understood from FIG. 4 that a surge voltage of 1500 Vp is satisfied at 0.0003 mH and a surge voltage of 1800 Vp is satisfied at 0.004 mH.

As compared to the ranges (1) and (2), the volume and weight are made smaller and this range is characterized in that it is advantageous in compactness and light weight.

If a reactor in these ranges is used, the surge voltage influence can be reduced for the "shorter propagation time" motor and "standard" motor. However, for the "longer propagation time" motor shown in FIG. 4, lowering the surge voltage is more difficult as compared to the ranges (1) and (2). It is anticipated, therefore, that a reactor in the range (3) is not used for the "longer propagation time" but a reactor in the ranges (1) and (2) are required to be used. However, the "longer propagation time" motor has generally a relatively large volume and weight so that it can be said that even if a reactor in the ranges (1) and (2) is used, there is only a slight problem in terms of compactness and light weight.

A drop of the effective voltage can be reduced more than the case of using a reactor in the range (2).

Although the three ranges are defined, the embodiment is not limited thereto. For example, the ranges may be defined in the following.

(a) A range of $\geqq 0.0003$ mH and $\leqq 0.2$ mH, (b) a range of $\geqq 0.0003$ mH and $\leqq 0.04$ mH, and (c) a range of $\geqq 0.0003$ mH and $\leqq 0.004$ mH. These ranges (a) to (c) are defined by paying attention to the volume and weight of a reactor determined by the upper limit values. For example, for compactness, the outer dimension as described with reference to FIG. 6 is used as a target.

As described above, the ranges of a reactor of the embodiment may be properly set in accordance with the range of motor types, a drop degree of the effective voltage, the volume and weight and the like.

[Fourth Embodiment]

In FIG. 5, when a reactor is not used (only wirings), the rise time is 0.25 µs and its surge withstand voltage is 1400 Vp. If a target surge withstand voltage is set to 1500 Vp, there is a possibility of insulation deterioration between motor windings so that it is necessary to raise the surge withstand voltage.

An AC reactor conventionally used as a countermeasure for dielectric breakdown by a surge voltage provides a rise time of 25 µs and can delay the rise time sufficiently so that insulation deterioration between windings does not occur. However, the system becomes large and expensive.

If reactors (0.01 mH) of wound windings of the embodiment are inserted, the rise time can be delayed to about 1 µs and the target surge withstand voltage of 1500 Vp can be cleared sufficiently. A reactor having an inductance of 0.01 mH can be realized by a core-less coil without requiring a core such as an iron core. For example, an inductance of about 0.01 mH can be obtained by winding a wire nine to sixteen turns in a ring shape having a diameter of about 10 cm, without requiring an iron core or the like. The number of turns, a diameter and the like can be designed by the following equation (1).

$$L = k*\mu*\Pi*(a*a)*(N*N)/b \; (H) \quad (1)$$

where each coefficients are:

K: Nagaoka coefficient, $\mu$: $=4*\Pi*10^{-7}$, a: coil diameter (m), b: coil length (m), and N=the number of coil turns.

If a three-phase a.c. is used for driving a motor, three ring-shape core-less coils are necessary each being used for each phase.

Other embodiments of the present invention will be described with reference to FIGS. 7 to 12.

Figure 7:
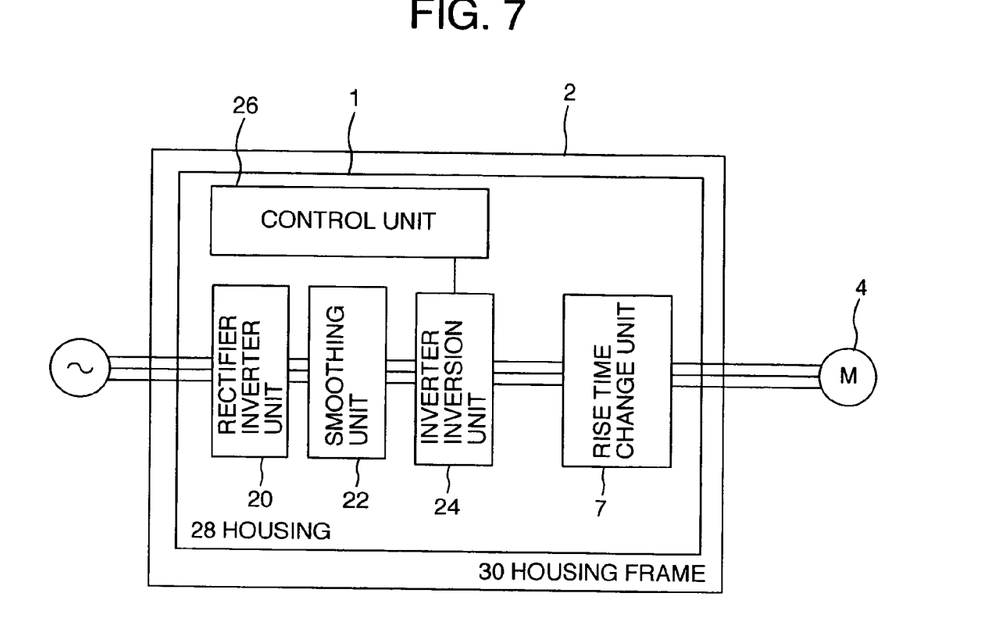
FIG. 7 is a diagram showing a system in which a rise time change unit is built in an inverter.

FIG. 7 shows a system in which a frequency converter 1 called an inverter drives a motor 4. A rise time change unit 7 having reactors with the above-described inductances are accommodated in the frequency converter 1.

The frequency converter 1 generally called an inverter has in its housing 28 a rectifier unit 20 for rectifying and a.c. power from a power supply unit to a d.c. power, a smoothing unit 22 for smoothing the output from the rectifier unit 20, an inverter unit 24 for inverting a d.c. power to an a.c. power and a control unit 26 for controlling at least the inverter unit 24. As compared to the inverter unit 24, control unit 26 and the like, the conventional AC filter, output filer, and sine wave forming filter have larger volumes and weights and are difficult to be accommodated in the housing. If they are to be accommodated in the housing of the frequency converter 1, the shape of the housing 28 is required to be changed.

However, the rise time change unit 7 of this embodiment is smaller than the conventional AC filters, output filers, sine wave forming filters and the like. Even the core-less coils having the above-described size can lower the surge voltage. The rise time change unit 7 using the coils of this size can be accommodated in the housing 28 of the frequency converter 1 as shown in FIG. 7 without a considerable design change of the housing 28. The system for driving a motor by a frequency converter can be made compact, light, and inexpensive.

Figure 8:
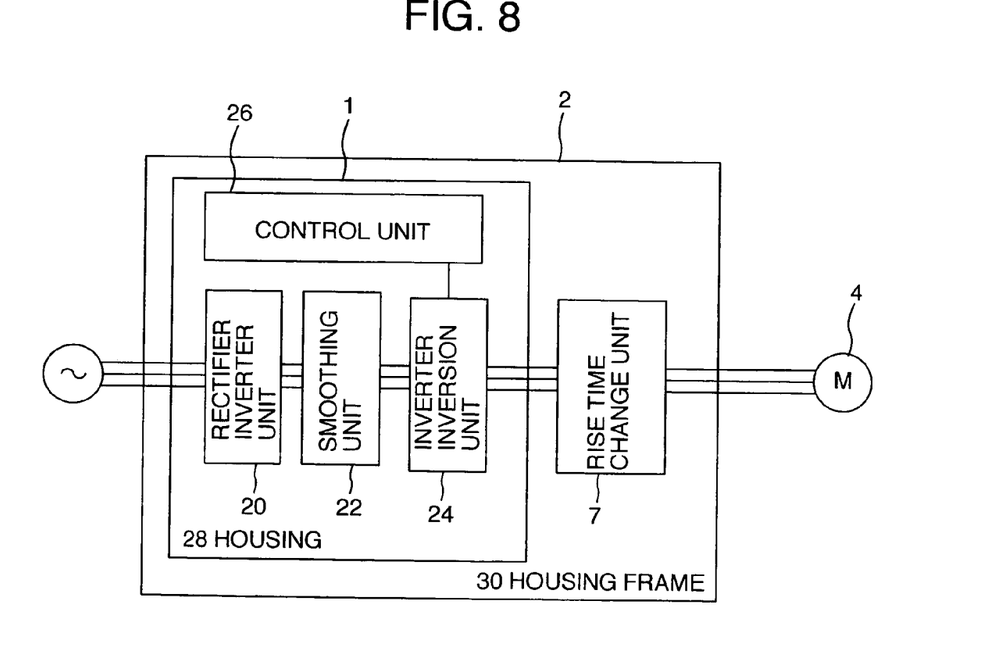
FIG. 8 is a diagram showing a system in which a rise time change unit is built in a control board.

FIG. 8 shows an embodiment of a system for driving a motor 4 by using a frequency converter 1 mounted in a control board 2.

In the embodiment shown in FIG. 8, a rise time change unit 7 having reactors with the above-described inductance is accommodated in the control board 2. As the rise time change unit 7 is installed in the control board 2, installation construction works can be omitted and works of forming an installation area for the rise time change unit 7 and other works are unnecessary.

If the reactors, core-less coils or the like described above are used for the rise time change unit 7 of the embodiment, the reactors, core-less coils or the like can be installed in the control board 2 relatively easily without greatly changing the shape of a housing frame 30 of the control board 2, as shown in FIG. 8.

Figure 9:
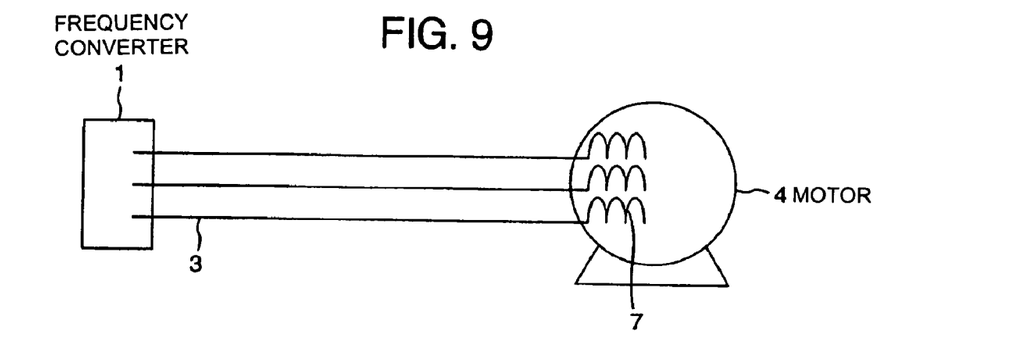
FIG. 9 is a diagram showing a system in which a rise time change unit is built in a motor.
Figure 10:
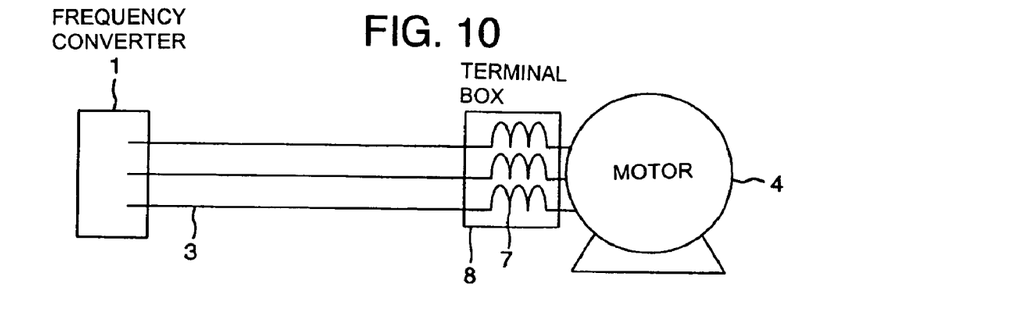
FIG. 10 is a diagram showing a system in which a rise time change unit is built in a motor terminal box.
Figure 11:
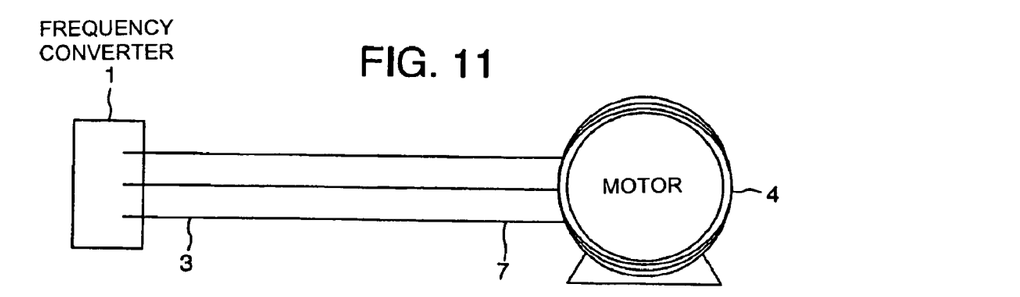
FIG. 11 is a diagram showing a system in which a rise time change unit is formed by winding cables between a power supply apparatus and a motor, about the outer periphery of the motor.

FIGS. 9 to 11 show embodiments in which a rise time change unit 7 having reactors with the above-described inductance is integrally formed with a motor 4.

FIG. 9 is a schematic diagram showing a rise time change unit 7 having the reactors with the above-described inductance installed in the housing of a motor 4. FIG. 10 is a schematic diagram showing a rise time change unit 7 having the reactors with the above-described inductance installed in a terminal box 8 having terminals and the like for supplying a motor with a drive power output from the frequency converter or the like.

FIG. 11 is a schematic diagram showing an embodiment in which the core-less coils, reactors or the like as the rise time change unit are wound about an outer periphery of a motor 4. The core-less coils, reactors may be wound about a housing for supporting the motor 4, or they may be wound about the motor 4 and then the motor is covered with a housing, i.e., they may be wound inside the housing for supporting the motor 4.

In the embodiments shown in FIGS. 9 to 11, the core-less coils, reactors or the like as the rise time change unit are installed in the motor or its attachments (such as a terminal box), to thereby reduce the surge voltage influence. Obviously, the installation position is not limited only to the inside of the motor or its attachments, but the rise time change unit may be installed near or adjacent to the motor or its attachments. By using the motors of these embodiment, a system for reducing the surge voltage influence can be configured without greatly changing the system configuration including the frequency converter, control board and the like.

Figure 12:
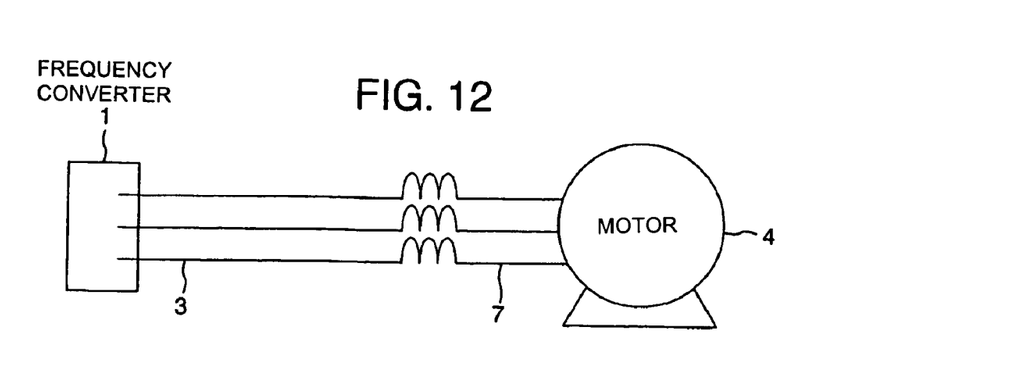
FIG. 12 is a diagram showing a system in which a rise time change unit is formed by cables between a power supply apparatus and a motor.

FIG. 12 is a schematic diagram showing the structure that intermediate portions of wiring cables 3 interconnecting a frequency converter 1 and a motor 4 are wound in a coil shape to form a rise time change unit 7 having reactors with the above-described inductance. Obviously, in addition to winding portions of the cables, a discrete rise time change unit having the core-less coils, reactors or the like may be inserted at desired positions of the cables 3. In this embodiment, during maintenance works such as reducing the surge voltage influence, the discrete rise time change unit having the core-less coils, reactors or the like may be involved at intermediate positions of the cables 3. Alternatively, the rise time change unit may be installed at intermediate positions of wiring cables interconnecting a frequency converter 1 and a motor 4, when the system having the frequency converter 1 and motor 4 is configured.

As described in these embodiment, the rise time change unit 7 can be installed in a space sufficient for disposing windings, without greatly changing the system structure including the control board, frequency converter and motor. A surge voltage countermeasure system can be configured more easily than a conventional system.

According to the embodiments of the present invention, a surge voltage can be processed with a simpler structure than that of a conventional system.

The simpler structure may be a structure that reactors with only wound wirings or the like are installed at desired positions between an output unit of a frequency converter and windings of a motor, or other structures.

Table 1 shows comparisons between a standard inverter, a standard AC reactor, a sine wave forming filter, and only wound wirings (embodiment), when the volume and capacity of a standard motor of some type are set to 100%.

TABLE 1

|  | Product | Weight | Volume |
| --- | --- | --- | --- |
|  | Motor | 100% | 100% |
|  | Inverter | 13% | 38% |
| Conventional | AC reactors | 33% | 30% |
|  | Sine wave forming filters | 47% | 44% |
| Embodiment | Wound windings | 2% | 3% |

Both the weights and volumes of the conventional AC reactors, output filters, and sine wave forming filters for suppressing insulation deterioration by a surge voltage are about 30% and 45%, respectively, relative to those of the standard motor. The weight is about 250 to 350% relative to the standard inverter and the volume is almost the same. Therefore, a system configuration becomes large by inserting the AC reactors, output filers or sine wave forming filters.

In contrast, both the weight and volume of the embodiment, e.g., only wound wirings, are light and compact at about 2 to 3% relative to the standard motor. The rise time change unit having this weight and volume can be accommodated in a control board disposed between an inverter and a motor or in the inside of the inverter or motor. The structure of a facility having the inverter and motor is not necessary to be changed greatly, realizing compactness and low cost.

An effective voltage can be suppressed from being lowered by inserting AC reactors, output filters, or sine wave forming filters.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A frequency converter for outputting an a.c. power to drive a motor, comprising:
    an inverter unit for inverting a d.c. power to an a.c. power;
    a control unit for controlling said inverter unit; and
    a housing for supporting at least said inverter unit and said control unit,
    wherein a rise time change unit is provided in said housing, said rise time change unit changes a rise time of a waveform of a voltage of the a.c. power output from said inverter unit.

2. The frequency converter according to claim 1, wherein said rise time change unit is reactors having an inductance equal to or larger than 0.0003 mH and equal to or smaller than 0.2 mH.

3. A motor to be driven by an a.c. power output from a frequency converter, comprising:
    terminals to which the power output from the frequency converter is applied; and
    a terminal box as a housing for supporting said terminals,
    wherein a rise time change unit is provided in said terminal box, said rise time change unit changes a rise time of a waveform of a voltage of the a.c. power output from the frequency converter.

4. The motor according to claim 3, wherein said rise time change unit is reactors having an inductance equal to or larger than 0.0003 mH and equal to or smaller than 0.2 mH.

5. A motor to be driven by an a.c. power output from a frequency converter, comprising:
    a rise time change unit provided in a housing for supporting the motor, said rise time change unit changes a rise time of a waveform of a voltage of the a.c. power output from the frequency converter.

6. The motor according to claim 5, wherein said rise time change unit is reactors having an inductance equal to or larger than 0.0003 mH and equal to or smaller than 0.2 mH.

7. The motor according to claim 5, wherein said rise time change unit is wound about an external periphery of the motor.

8. The motor according to claim 7, wherein said rise time change unit is reactors having an inductance equal to or larger than 0.0003 mH and equal to or smaller than 0.2 mH.

9. A motor drive system having a frequency converter and a motor and driving the motor by applying an a.c. power output from the frequency converter to motor windings, comprising:
    a rise time change unit provided between said frequency converter and said motor windings, said rise time change unit changes a rise time of a waveform of a voltage of the a.c. power to be applied to said motor windings,
    wherein said rise time change unit is reactors having an inductance equal to or larger than 0.0003 mH and equal to or smaller than 0.2 mH.

10. The motor driving system according to claim 9, wherein said rise time change unit is core-less reactors.

11. A maintenance method for a motor drive system for driving a motor by applying an a.c. power output from a frequency converter to motor windings, wherein:
    a rise time change unit is provided between the frequency converter and the motor windings, said rise time change unit changes a rise time of a waveform of a voltage of the a.c. power to be applied to the motor windings; and
    reactors having an inductance equal to or larger than 0.0003 mH and equal to or smaller than 0.2 mH are used as said rise time change unit.

12. The maintenance method for a motor drive system according to claim 11, wherein said rise time change unit is core-less reactors.

13. The maintenance method for a motor drive system according to claim 11, wherein said rise time change unit is provided in a housing frame for accommodating the frequency converter.

* * * * *